United States Patent [19]
Kessler et al.

[11] Patent Number: 5,835,925
[45] Date of Patent: Nov. 10, 1998

[54] USING EXTERNAL REGISTERS TO EXTEND MEMORY REFERENCE CAPABILITIES OF A MICROPROCESSOR

[75] Inventors: Richard E. Kessler, Eau Claire; Steven M. Oberlin, Chippewa Falls; Steven L. Scott; Eric C. Fromm, both of Eau Claire, all of Wis.

[73] Assignee: Cray Research, Inc., Eagan, Minn.

[21] Appl. No.: 615,671

[22] Filed: Mar. 13, 1996

[51] Int. Cl.⁶ .................................................. G06F 12/00
[52] U.S. Cl. ................... 711/2; 711/212; 711/220
[58] Field of Search .................... 395/402, 421.01, 395/421.02, 421.07, 421.1; 711/2, 211, 212, 217, 220

[56] References Cited

U.S. PATENT DOCUMENTS

| | | | |
|---|---|---|---|
| Re. 28,577 | 10/1975 | Schmidt | 370/324 |
| 4,771,391 | 9/1988 | Blasbalg | 395/200.62 |
| 4,868,818 | 9/1989 | Madan et al. | 395/182.02 |
| 4,933,933 | 6/1990 | Dally et al. | 370/406 |
| 4,974,143 | 11/1990 | Yamada | 711/217 |
| 4,987,537 | 1/1991 | Kawata | 711/212 |
| 5,008,882 | 4/1991 | Peterson et al. | 370/406 |
| 5,031,211 | 7/1991 | Nagai et al. | 379/221 |
| 5,105,424 | 4/1992 | Flaig et al. | 395/200.73 |
| 5,157,692 | 10/1992 | Horie et al. | 375/260 |
| 5,170,482 | 12/1992 | Shu et al. | 395/800.12 |
| 5,175,733 | 12/1992 | Nugent | 370/400 |
| 5,218,601 | 6/1993 | Chujo et al. | 370/228 |
| 5,218,676 | 6/1993 | Ben-ayed et al. | 395/200.7 |
| 5,239,545 | 8/1993 | Buchholz | 370/348 |
| 5,255,376 | 10/1993 | Frank | 395/285 |
| 5,280,474 | 1/1994 | Nickolls et al. | 370/389 |
| 5,313,628 | 5/1994 | Mendelsohn et al. | 395/182.01 |
| 5,313,645 | 5/1994 | Rolfe | 395/800.11 |
| 5,331,631 | 7/1994 | Teraslinna | 370/392 |
| 5,333,279 | 7/1994 | Dunning | 395/280 |
| 5,341,504 | 8/1994 | Mori et al. | 395/800.12 |
| 5,347,450 | 9/1994 | Nugent | 395/200.73 |
| 5,353,283 | 10/1994 | Tsuchiya | 370/392 |
| 5,394,528 | 2/1995 | Kobayashi et al. | 395/307 |
| 5,440,547 | 8/1995 | Easki et al. | 370/395 |
| 5,517,497 | 5/1996 | LeBoudec et al. | 370/399 |
| 5,546,549 | 8/1996 | Barrett et al. | 395/309 |
| 5,548,639 | 8/1996 | Ogura et al. | 379/221 |
| 5,550,589 | 8/1996 | Shiojiri et al. | 348/387 |
| 5,555,542 | 9/1996 | Ogura et al. | 370/400 |
| 5,600,606 | 2/1997 | Rao | 365/233 |
| 5,627,986 | 5/1997 | Frankland | 711/2 |
| 5,649,125 | 7/1997 | Tietjen et al. | 395/306 |

FOREIGN PATENT DOCUMENTS

| | | |
|---|---|---|
| 0501524 A2 | 9/1992 | European Pat. Off. . |
| 0570729 A2 | 11/1993 | European Pat. Off. . |
| 88/08652 | 4/1988 | WIPO . |

OTHER PUBLICATIONS

"Deadlock–Free Routing Schemes on Multistage Interconnection Networks", *IBM Technical Disclosure Bulletin, 35*, 232–233, (Dec., 1992).

Adve, V.S., et al., "Performance Analysis of Mesh Interconnection Networks with Deterministic Routing", *Transactions on Parallel and Distributed Systems*, 225–246, (Mar. 1994).

(List continued on next page.)

*Primary Examiner*—Eddie P. Chan
*Assistant Examiner*—Kevin Verbrugge
*Attorney, Agent, or Firm*—Schwegman, Lundberg, Woessner & Kluth, P.A.

[57] ABSTRACT

A system and method of accessing a memory location within a system having a processor and a plurality of memory locations separate from the processor. The system includes a plurality of external registers which are connected to the processor over a data bus, address translation means, connected to the processor over the data bus and an address bus, for calculating, based on an index written to the data bus, an address associated with one of the memory locations, and transfer means, connected to the plurality of external registers, for transferring data between the addressed memory location and one of the external registers.

20 Claims, 14 Drawing Sheets

OTHER PUBLICATIONS

Bolla, F.R., "A Neural Strategy for Optimal Multiplexing of Circuit and Packet–Switched Traffic", *Department of Communications, Computer and Systems Science (DIST), University of Genova*, 1324–1330.

Bolding, K., "Non–Uniformities Introduced by Virtual Channel Deadlock Prevention", *Technical Report 92–07–07, Department of Computer Science and Engineering, FR–35 University of Washington*; Seattle, WA 98195, (Jul. 21, 1992).

Boura, Y.M., et al., "Efficient Fully Adaptive wormhole Routing in n–dimensional Meshes", *IEEE*, pp. 589–596, (Jun. 21, 1994).

Chien & J.h. Kim, A.A., "Planar–Adaptive Routing: Low–Cost Adaptive Networks for Multiprocessors", *Pro. 19th International Symposium on Computer Architecture at 268–277*, (May 1992).

Dally & Aoki, H, W.J., "Deadlock–Free Adaptive Routing in Multicomputer Networks Using Virtual Channels", *I.E.E.E. Transactions on Parallel and Distributed Systems*, vol. 4, No. 4, at 466–475, (Apr. 1993).

Dally, W., et al., "Deadlock–Free Message Routing in Multiprocessor Interconnection Networks", *IEEE Transactions on Computers*, C–36, 547–553 (May 1987).

Dally, W., "Performance Analysis of k–ary n–cube Interconnection Networks", *IEEE Transactions on Computers*, vol. 39, No. 6, 775–785 (Jun. 1990).

Dally, W.J., "Virtual Channel Flow Control", *Pro. 17th International Symposium on Computer Architecture*, pp. 60–68, (May 1990).

Duato, J., "A New Theory of Deadlock–Free Adaptive Routing in Wormhole Networks", *I.E.E.E. Transactions on Parallel and Distributed Systems*, vol. 4, No. 12, at 1320–1331, (Dec. 1993).

Gallager, R., "Scale Factors for Distributed Routing Algorithms", *NTC '77 Conference Record 2*, at 2–1 through 2–5.

Glass, C.J., et al., "The Turn Model for Adaptive Routing", *Pro. 19th Interanational Symposium on Computer architecture*, 278–287, (May 1992).

Gravano, L., et al., "Adaptive Deadlock– and Livelock–Free Routing with all Minimal Paths in Torus Networks", *IEEE Transactions on Parallel and Distributed Systems*, vol. 5, No. 12, 1233–1251, (Dec. 1994).

Jesshope, C.R., et al., "High Performance Communication in Processor Networks", *Pro. 16th International Symposium on Computer Architecture* at 150–157, (May 1989).

Kirkpatrick, S., et al., "Optimization by Simulated Annealing", *Science*, May 13, 1983, vol. 220, No. 4598, 671–680.

Linder, D.H., et al., "An Adaptive and Fault Tolerant Wormhole Routing Strategy for k–ary n–cubes", *I.E.E.E. Trans. on Computers*, vol. 40, No. 1, 2–12, (Jan. 1991).

Lui, Z., et al., "Grouping Virtual Channels for Deadlock–Free Adaptive Wormhole Routing", *PARLE '93 Parallel Parallel Architectures and Languages Europe, 5th International PARLE Conference*, Munich, Germany, 255–265, (Jun. 14–17, 1993).

Nuth, P., et al., "The J–Machine Network", *IEEE*, 420–423, (1992).

Shumway, M., "Deadlock–Free Packet Networks", *Transputer Research and Applications 2, NATUG–2 Proceedings of the Second Conference of the North American Transputer Users Group*, 140–177, (Oct. 18–19, 1989).

Snyder, L., "Introduction to the Configurable, Highly Parallel Computer", *IEEE*, 47–56, (Jan., 1982).

Talia, D., "Message–Routing Systems for Transputer–Based Multicomputers", *IEEE Micro*, vol. 13, No. 3, New York US., 62–72, (Jun., 1993).

Wang, W., et al., "Trunk Congestion Control in Heterogeneous Circuit Switched Networks", *IEEE*, vol. 40, No. 7, pp. 1156–1161, (Jul. 1992).

Yang, C.S., et al., "Performance Evaluation of Multicast Wormhole Routing in 2D–Torus Multicomputers", *IEEE*, 173–178, (1992).

Yantchev, J., et al., "Adaptive, low latency, deadlock–free packet routing for networks of processors", *IEE Proceedings*, vol. 136, Pt.E, No. 3, 178–186 (May 1989).

| CODE | NAME | DESCRIPTION |
|------|------|-------------|
| 00 | EMPTY | REGISTER IS EMPTY. |
| 01 | FULL_F | REGISTER IS FULL, OPERATION FAILED BECAUSE OF AN ERROR. |
| 10 | FULL | REGISTER IS FULL, NO ERROR CONDITIONS OCCURRED. |
| 11 | FULL_SR | REGISTER IS FULL, SEND WAS REJECTED. |

| | 00 |
|---|---|
| INDEX | |

| | 00 | |
|---|---|---|
| CENTRIFUGE MASK | | ~136 |
| BASE ADDRESS OFFSET (ALSO INCLUDES REMOTE MEMORY-MAPPED REGISTER BIT) | | ~138 |
| STRIDE OR SWAP MASK OR COMPARAND | | ~147 |
| OPERAND OR SWAPERAND | | ~149 |

| M-O | |
|---|---|

63

132

| OPCODE | OPERATION | COMMAND ARGUMENTS |
|---|---|---|
| LOAD | LOAD FROM E-REGISTER TO INTERNAL CPU REGISTER | A |
| STORE | STORE TO E-REGISTER FROM INTERNAL CPU REGISTER | A D |
| GET8 | MOVE 64-BIT WORD FROM MEMORY TO E-REGISTER | A PI |
| GET4 | MOVE 32-BIT HALF-WORD FROM MEMORY TO E-REGISTER | A PI |
| GETV8 GETV4 | MOVE VECTOR OF 8 WORDS FROM MEMORY TO 8 ALIGNED E-REGISTERS. STRIDE IN M-O BLOCK | A PI |
| PUT8 | MOVE 64-BIT WORD FROM E-REGISTER TO MEMORY | A PI |
| PUT4 | MOVE 32-BIT HALF-WORD FROM E-REGISTER TO MEMORY | A PI |
| PUTV8 PUTV4 | MOVE AN ALIGNED BLOCK OF 8 E-REGISTERS TO MEMORY. STRIDE IN M-O BLOCK. | A PI |
| ERS_READ | RETURN VALUES OF E-REGISTER STATE CODES FOR 32 CONTIGUOUS, ALIGNED E-REGISTERS | A |
| ERS_WRITE | ESTABLISH VALUE OF E-REGISTER STATE CODES FOR 32 CONTIGUOUS, ALIGNED E-REGISTERS (PRIVILEGED) | A D |
| ATOMIC-OP[6] | PERFORM INDIVISIBLE READ-MODIFY-WRITE OPERATION ON MEMORY CONTENTS USING E-REGISTER AS OPERANDS | A PI |
| SPECIAL-OP[7] | PERFORM OPERATION ON STORE OR MEMORY DATA, DELIVERING RESULT TO E-REGISTER | A D |
| SEND | LAUNCH 64-BYTE MESSAGE ASSEMBLED IN ALIGNED E-REGISTERS TO TARGET PE | A PI |

FIG. 10

| ATOMIC OPERATION | FUNCTION | ARGUMENTS |
|---|---|---|
| GET_INC8<br>GET_INC4 | RETURN CONTENTS OF MEMORY LOCATION TO E-REGISTER; INCREMENT CONTENTS OF MEMORY LOCATION. 64-BIT (8 BYTE) OR 32-BIT (4-BYTE) WORD. | A P I |
| MSWAP8<br>MSWAP4 | EXCHANGE ARGUMENT DATA WITH MEMORY DATA (BIT-BY-BIT) BASED UPON THE BITS FROM THE SWAP MASK; RETURN ORIGINAL MEMORY CONTENTS TO E-REGISTER. | A S I |
| CSWAP8<br>CSWAP4 | COMPARE ARGUMENT 1 WITH MEMORY CONTENTS; IF EQUAL, EXCHANGE ARGUMENT 2 WITH MEMORY DATA; RETURN ORIGINAL MEMORY CONTENTS TO E-REGISTER. | A S I |
| GET_ADD8<br>GET_ADD4 | ADD ARGUMENT VALUE TO CONTENTS OF MEMORY. RETURN ORIGINAL MEMORY CONTENTS TO E-REGISTER. | A Q I |

FIG. 11

| STORE OPERATION | FUNCTION | ARGUMENTS |
|---|---|---|
| STORE_PLZ8<br>STORE_PLZ4 | COUNT NUMBER OF SET BITS (LOGICAL 1) IN STORED DATA WORD. STORE COUNT IN E-REGISTER IN BITS 0-6.<br><br>COUNT NUMBER OF LEADING-ZERO BITS IN STORED DATA WORD. STORE COUNT IN E-REGISTER IN BITS 32-36. | A D |
| STORE_CENT | SEPARATE INDEX INTO COMPONENT PE, OFFSET. SAVE CONCATENATED PE/OFFSET (PE IN BITS 62-44, OFFSET IN BITS 43-0) IN E-REGISTER. REMOTE MMR BIT FROM BASE OFFSET REGISTER IS PASSED THROUGH IN BIT 63. | A PI |

FIG. 12

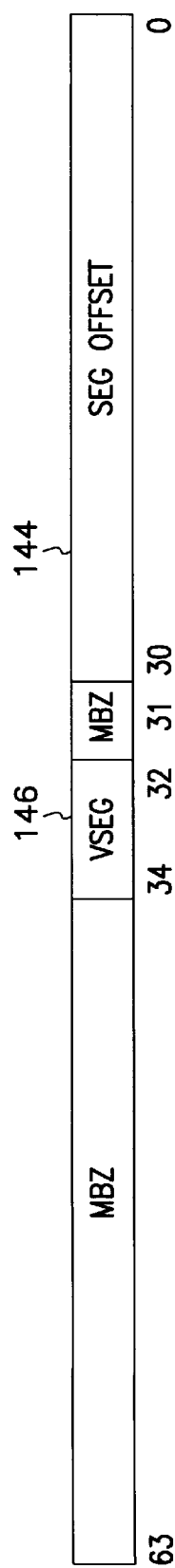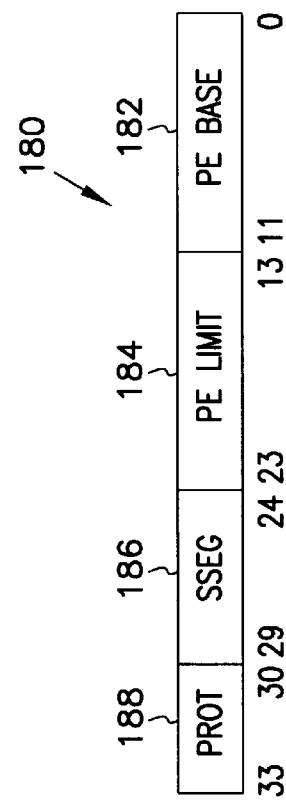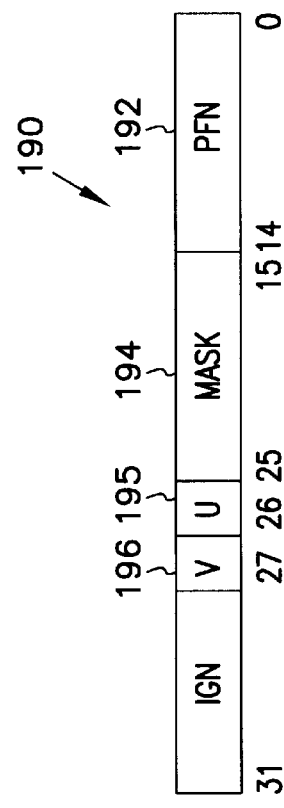
FIG. 14
FIG. 15
FIG. 17

| RTB_CTL_EA_SIZE[1:0] | RTB_EA SIZE |
|---|---|
| 00 | 128K |
| 01 | 256K |
| 10 | 512K |
| 11 | 1024K |

FIG. 16

USING EXTERNAL REGISTERS TO EXTEND MEMORY REFERENCE CAPABILITIES OF A MICROPROCESSOR

STATEMENT REGARDING GOVERNMENT RIGHTS

The present invention was made with government support under MDA 972-95-3-0032, awarded by ARPA. The Government has certain rights in this invention.

BACKGROUND OF THE INVENTION

1. Field of the Invention

The present invention relates to a method and apparatus for addressing computer system memory and more particularly to a method and apparatus for extending the memory reference capabilities of a microprocessor.

2. Background Information

The size of the address space available to a given microprocessor is critical in determining whether it can be used in a given application. Address size limits physical memory, and thus the size of an application's data set. Since the limitation is reflected in the width of anything that may contain an address (i.e. program counters, address registers, etc.), it is difficult to increase the effective address space. Therefore, the failure to allocate enough address bits can result in the premature obsolescence of the microprocessor.

The problem of limited addressing is further aggravated in a massively parallel processing system. Massively parallel processing systems use hundreds or thousands of processing elements (PEs) linked together by high speed interconnect networks. Typically, each PE includes a processor, local memory and an interface circuit connecting the PE to the interconnect network. A distributed memory massively parallel processing (MPP) system is one wherein each processor has a favored low latency, high bandwidth path to one or more local memory banks, and a longer latency, lower bandwidth access over the interconnect network to memory banks associated with other processing elements (remote or global memory). In globally addressed distributed memory systems, all memory is directly addressable by any processor in the system. This means that some portion of the address goes to identifying the processor whose memory is being accessed. In an MPP system having 2048 processors eleven bits of addressing go simply to identifying the processor. For a system based on processors having only thirty two bit wide address paths, the loss of the eleven bits limits addressing to a couple of MBytes on each processing node. This is insufficient memory for a high performance MPP system.

One method of extending the address space of address-space-limited microprocessors is segmentation. Under segmentation, an address consists of two parts: a segment number and a segment offset. The segment number is mapped to a physical address and the offset added to that physical address to obtain the physical address of the referenced memory location. The biggest disadvantage has been that, in contrast to paging, segmentation splits the address space into logically separate pieces that must be manipulated as a two-part address. This results in awkwardness (both programmers and compilers must be aware of the address convention) and performance penalties.

There is a similar problem with instruction sets. Commodity microprocessors come with predefined instruction sets. It is difficult to extend the instruction set to create new functionality.

What is needed is a method and system for extending both the address space and the instruction set of commercial microprocessors without the penalties associated with previous solutions.

SUMMARY OF THE INVENTION

The present invention is a system and method of accessing a memory location within a system having a processor and a plurality of memory locations separate from the processor. The system includes a plurality of external registers connected to the processor over a data bus, address translation means, connected to the processor over the data bus and an address bus, for calculating, based on an index written to the data bus, an address associated with one of the memory locations, and transfer means, connected to the plurality of external registers, for transferring data between the addressed memory location and one of the external register. The transfer means includes means for supporting multiple external memory references.

Another aspect of the present invention is a method of extending the address space of a microprocessor having an external data path, wherein the external data path is connected to a plurality of external registers, including a first external register. A register operation data word having an index field is defined and an index is written into the index field. A memory instruction is then executed by writing the register operation data word to an address associated with the first external register, calculating, based on the index, an address for a memory location and then transferring data between the memory location and the first external register.

Yet another aspect of the present invention is a method of executing atomic operations in a system having a microprocessor, wherein the microprocessor includes an external data path. A plurality of external registers, including a first external register, are provided and a register operation data word having an index field is defined. An index is written into the index field and a first operand is stored into the first external register. An atomic operation instruction is then executed, wherein the step of executing the atomic operation instruction includes the steps of writing the register operation data word to an address associated with the first external register, calculating, based on the index, an address for a memory location and performing an indivisible read-modify-write operation on data stored in the memory location. The step of performing an indivisible read-modify-write includes the steps of reading the memory location to obtain a second operand, calculating a result as a function of the first and second operands and storing the result in said memory location.

Yet another aspect of the present invention is a system and method of extending a microprocessor's instruction set. A plurality of external registers, including a first external register, is provided and a register operation data word is defined. An extended instruction is executed, wherein the step of executing the extended operation instruction includes the steps of writing the register operation data word to an address associated with the first external register, calculating a result as a function of the register operation data word and storing the result in said first external register.

Yet another aspect of the present invention is a system and method of executing an external register instruction. A plurality of external registers is provided and an MOB pointer and an external register operation data word are defined. The MOB pointer points to an aligned block of arguments stored in the plurality of external registers while the external register operation data word includes an index field and an MOB pointer field. An argument data word is stored in the aligned block of arguments. The MOB pointer is then loaded into the MOB pointer field and the external register operation data word is written to an external address, wherein the step of writing includes the steps of decoding the external address to determine the external register instruction, extracting the MOB pointer from the MOB pointer field, accessing the aligned block of arguments to obtain the operand and calculating a result as a function of the argument data word.

BRIEF DESCRIPTION OF THE DRAWINGS

The foregoing and other objects, features and advantages of the invention, as well as the presently preferred embodiments thereof, will become apparent upon reading and understanding the following detailed description and accompanying drawings in which:

FIG. 2 is a table showing state codes associated with the external registers;

FIG. 7 shows a memory mapping scheme which can be used to provide an E-register instruction;

FIG. 8 shows the format of the information transferred on data bus 18 of FIG. 5 when the E-registers are used in centrifuged addressing mode;

FIG. 9 shows an example of an aligned block of arguments which could be used in a centrifuged memory reference;

FIG. 10 is a table listing some of the major E-register commands;

FIG. 11 shows a set of atomic operations which can be performed on system memory via E-registers;

FIG. 12 lists examples of instructions which can be used to augment the capabilities of a microprocessor according to the current invention;

FIG. 14 shows one possible mapping of the virtual address space available to each processor in an MPP system;

FIG. 15 depicts an STT entry;

FIG. 16 depicts one exemplary RTB_CTL_EA_SIZE encoding used to select the size of the RTB_EA in DRAM;

FIG. 17 depicts an RTB array entry; and

DETAILED DESCRIPTION OF THE PREFERRED EMBODIMENTS

In the following Detailed Description of the Preferred Embodiments, reference is made to the accompanying Drawings which form a part hereof, and in which are shown by way of illustration specific embodiments in which the invention may be practiced. It is to be understood that other embodiments may be utilized and structural changes may be made without departing from the scope of the present invention.

Figure 1:
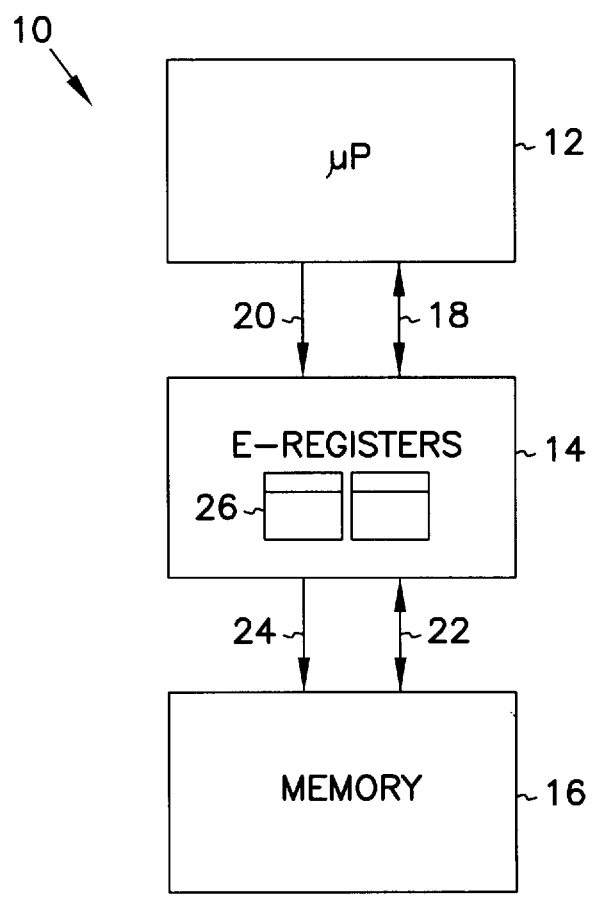
FIG. 1 is a simplified block diagram of a microprocessor system having external registers.

A microprocessor system 10 is illustrated in FIG. 1. In FIG. 1, a microprocessor 12 is connected through external register circuit 14 to memory 16. External register circuit 14 includes a plurality of external registers 26 (E-registers). Microprocessor 12 is capable of reading from and writing to E-registers 26 via external data path 18 and external address path 20. Likewise, external register circuit 14 is capable of reading from and writing to memory 16 via memory data path 22 and memory address path 24.

In one embodiment, microprocessor 12 is a commodity microprocessor such as the EV5 or the EV56 available from Digital Equipment Corporation. (The EV5 microprocessor is sold as DEC P/N 21164 while the EV56 is sold as DEC P/N 21164A.) Commodity microprocessor implementations impose limitations on the types of application behaviors that can be supported efficiently. External register circuit 14 provides a means to extend the capabilities of the commodity microprocessor with minimal requirements imposed on microprocessor 12.

E-registers 26 are mapped directly into the memory space of microprocessor 12. This provides high-bandwidth and low-latency load and store access to the registers themselves. In addition, in one embodiment, special memory-mapped store operations are used to provoke the E-registers to reference normal memory locations. These special operations include the ability to move data to/from E-registers 26 and memory locations in memory 16, to perform memory synchronization operations, initiate message transfers (to, for instance, other microprocessors), and to perform local operations that otherwise cannot be performed quickly within microprocessor 12. E-registers 26 serve as source or destination for additional operands and can be used to store the results of operations on operands supplied by microprocessor 12 or even for the results of operations on those operands previously stored in E-registers 26.

In one embodiment microprocessor 12 is a 64-bit microprocessor. In such an embodiment, external registers circuit 14 supports fully-symmetrical 64 and 32-bit operations.

In typical microprocessor systems, transactions used to move data between the microprocessor and the external world contain both an address and data as part of the transaction. Most systems that use microprocessors use the address portion of the transaction to reference memory. With E-registers, the data portion can be used to address the memory instead. This has several advantages. First, this allows the addresses to be the full width of a data word (in the DEC Alpha series microprocessors the data word is 64 bits in length). Most physical addresses on microprocessors are smaller than this. Second, the available data bandwidth is typically higher than the available address bandwidth. This implies that more addresses can be issued more quickly when the addresses come out the data path. Finally, it allows the addresses to bypass the on-chip address translation mechanism, allowing the external system to supplement the address translation capabilities of the microprocessor.

In one embodiment, each E-register operation places information on both external data path 18 and external address path 20. The information placed on external address path 20 encodes not only the operation identifier but can also be used to designate the source and/or destination E-registers. The information placed on external data path 18 provides 64-bits of information that the E-registers interpret as address information. Most of this 64-bit address information encodes the particular memory location in memory 16 being accessed; thus, even if the microprocessor itself only supports a very small address range via the normal addressing path, E-registers 26 can support a much larger space (nearly 64-bits worth).

In one embodiment, other operands may be needed for a particular memory-mapped store operation. In such an embodiment, a small identifier may be included as part of the information placed on external data path 18 in order that the E-registers 26 associated with these additional operands can be identified. For instance, additional operands may be needed to support an "address centrifuge" data distribution translation that can be automatically performed on the rest of the address. Address centrifuging is described in U.S. patent application Ser. No. 08/165118 entitled "SYSTEM AND METHOD OF ADDRESSING DISTRIBUTED MEMORY WITHIN A MASSIVELY PARALLEL PROCESSING SYSTEM", filed Dec. 10, 1993 by Oberlin et al., the description of which is hereby incorporated by reference. Additional operands may also be required in order to provide synchronization primitive values or to provide a stride value required by vector operations. In one such embodiment, vector operations (on fixed-size vectors of length 8) can be used to efficiently support bulk data transfers, including memory-to-memory, memory-to-register, and register-to-memory.

E-register operations may also be designed to take advantage of any performance enhancements due to spatial locality in the microprocessor; thus all E-register operations to sequential E-registers may result in merged references to a block of sequential addresses.

In one embodiment the basic operations supported by the E-registers include: load a vector from memory 16 to a block of E-registers 26, store a vector from a block of E-registers 26 to memory 16, load from E-register 26 to a register within microprocessor 12, and store from a register within microprocessor 12 to an E-register 26. These operations will be further described below. In addition, the loads/stores between the E-registers 26 and memory 16 can optionally be centrifuged to accomplish automatic hardware data distribution. Address translation and protection checking can also performed during these operations.

In one embodiment, atomic memory synchronization operations are supported by external registers circuit 14. In one such embodiment, the synchronization operations include: masked swap, compare-and-swap, get-and-add, and get-and-increment. These operations will be described in further detail below.

To load data from a memory location to an internal microprocessor register using an E-register 26, the application first issues a GET E-register command. Then later microprocessor 12 loads the data from an E-register 26 into a microprocessor register via a LOAD E-register command. The application can issue many GET's before it must LOAD the data since there are many E-registers (up to 1024 per context in the preferred embodiment). This allows for many outstanding memory system references.

To store data from the microprocessor to a memory location, microprocessor 12 first stores the data from the on-chip register to E-register 26 using a STORE E-register command. Then the application sends the data in E-register 26 to a memory location in a memory 16 using a PUT E-register command. Hereafter, we use the terms LOAD and STORE when referring to transfers between the E-registers and the processor registers. Other operations like GET and PUT transfer data between E-registers 26 and memory 16.

E-register State Codes

In one embodiment, each E-register 26 has a state that the application can poll to determine that state of outstanding memory references. A representative set of states is listed in FIG. 2. When a GET has been issued but the data has not yet been deposited in the selected E-register 26, the state transitions to EMPTY. FULL indicates that register 26 is filled with useful data. FULL_F typically indicates that a GET operation failed, perhaps due to an out-of-bound memory reference. FULL_SR indicates that the register has useful data, but a prior SEND (a special "message send") failed because a message queue at a remote PE was full.

Accesses to E-registers 26 are implicitly synchronized by the state codes. An attempt to LOAD from an E-register 26 that is in state EMPTY stalls the LOAD until the E-register 26 is filled. In one embodiment, a plurality of execution modes are provided and, depending on the execution mode set by the application, a LOAD from a FULL_F E-register may cause an error interrupt. A LOAD from a FULL or FULL_SR E-register 26 returns the E-register data without an error.

In the embodiment shown in FIG. 2, two bits of E-register state code (ERS code) are provided for each E-register 26. In one such embodiment, E-register states 30 can be queried with an ERS_READ E-register operation. This command returns the 2-bit ERS codes for 32 adjacent E-registers 26. It can be used to determine if a GET has returned, for instance, though in the usual case the overhead of the ERS_READ outweighs its benefit. It is most useful for E-register context switching. The operation ERS_WRITE updates the ERS codes of a particular set of E-registers 26.

In one embodiment, the E-register states 30 are stored in a dual-ported RAM block which must be read (usually multiple times) for every E-register directed LOAD or STORE command. This RAM provides parallel access to multiple state code pairs on each reference. In one embodiment, each location in the RAM contains 32 state code pairs and a parity bit for a total of 65 bits. For a system having 640 E-registers, this RAM will be 20 lines deep.

In one embodiment, the RAM structure used to store the E-register state codes can accept a new read and a new write request every system clock and includes logic which detects when a read is being done from a location that is being simultaneously written. In that case, the read out data is bypassed and replaced with the write data to provide an up-to-date copy of the new value stored at that location in the same clock period. The read and write ports are arbitrated together since all references to the RAM require both a read and corresponding write operation.

In one embodiment, three special structures are provided to improve the apparent state code RAM read/write bandwidth. These are the ERS summary bits, the response flag merge and the request flag cache mechanisms.

The summary bits provide a low latency flag check for PUTs, E_REG LOADs and for Mask/Offset/Operand block (MOB) references. In one embodiment, each ERS summary bit represents the summarized state of a sixteen word block of E-registers; two summary bits are provided on each line of the E-register state code RAM. A summary bit will be true only if all the associated E-register words are in one of the two non-faulted FULL states. The individual bits are immediately updated each time the associated RAM line is modified.

The request flag cache is a one or more entry content addressable memory (CAM) used as a write-back cache of the RAM lines which have been most recently referenced during FULL flag checks associated with E-register directed operations emerging from processor 12. It serves to buffer FULL checks and EMPTY writes associated with processor 12 requests in order to reduce the possibility of contention with returning GET responses/updates.

ERS_READ and ERS_WRITE operations also go through this cache. Although ERS_WRITEs modify the entire line, a full fetch of the specified line is first completed before the write proceeds so that no special sequencing is required for these operations. Likewise, an ERS_READ causes the ERS data being read to be brought into the cache in order to simplify sequencing control.

With the exception of MOB and LOAD related flag checks, a request-side miss in the cache for any reason will cause an immediate writeback of the displaced victim line and a simultaneous fetch of the new line. MOB and LOAD checks that miss will only result in a line replacement if the ERS summary flag test fails.

ERS writes on returning responses which hit in the cache are directed to the cache rather than the RAM (which will be updated later on a victim writeback). Response-side misses do not disturb the cache but rather update the RAM directly.

Response updates may be stalled for a period of time during victim writebacks but otherwise should proceed unimpeded.

EMPTY writes for outgoing E-register requests are requested simultaneously with destination flag reads. The write will not take place until the flags to be set EMPTY are all in a non-EMPTY state.

Whereas the ERS summary bit and ERS request flag cache mechanisms serve to reduce contention for state code RAM bandwidth from the requester side, the response flag merge logic attempts to group together individual ERS FULL writes (thereby enhancing apparent write bandwidth) for the returning responses. This is required since the worst case write bandwidth into the RAM is one ERS code per system clock period (assuming each ERS code update is to a different line) while the desired sustained E-register write bandwidth requires at least twice that. The merge buffer implementation must minimize latency for individual response updates where no contention is encountered while allowing ERS update writes which do contend to merge if they are to the same line. Thus, responses may continue to be written into the E_REG RAM even though the ERS write port may have begun to back up. Updates to the response flag require a read-modify-write sequence.

By accessing external memory through external register circuit 14, applications can access a very large address space, have many outstanding E-register memory references, manage bulk data transfers, and perform extended operations not directly supported by the microprocessor as well as additional multiprocessor synchronization and data-distribution primitives. All these enhancements increase the useability of the commodity microprocessor in a high-performance computing system.

E-registers in MPP Systems

Figure 3:
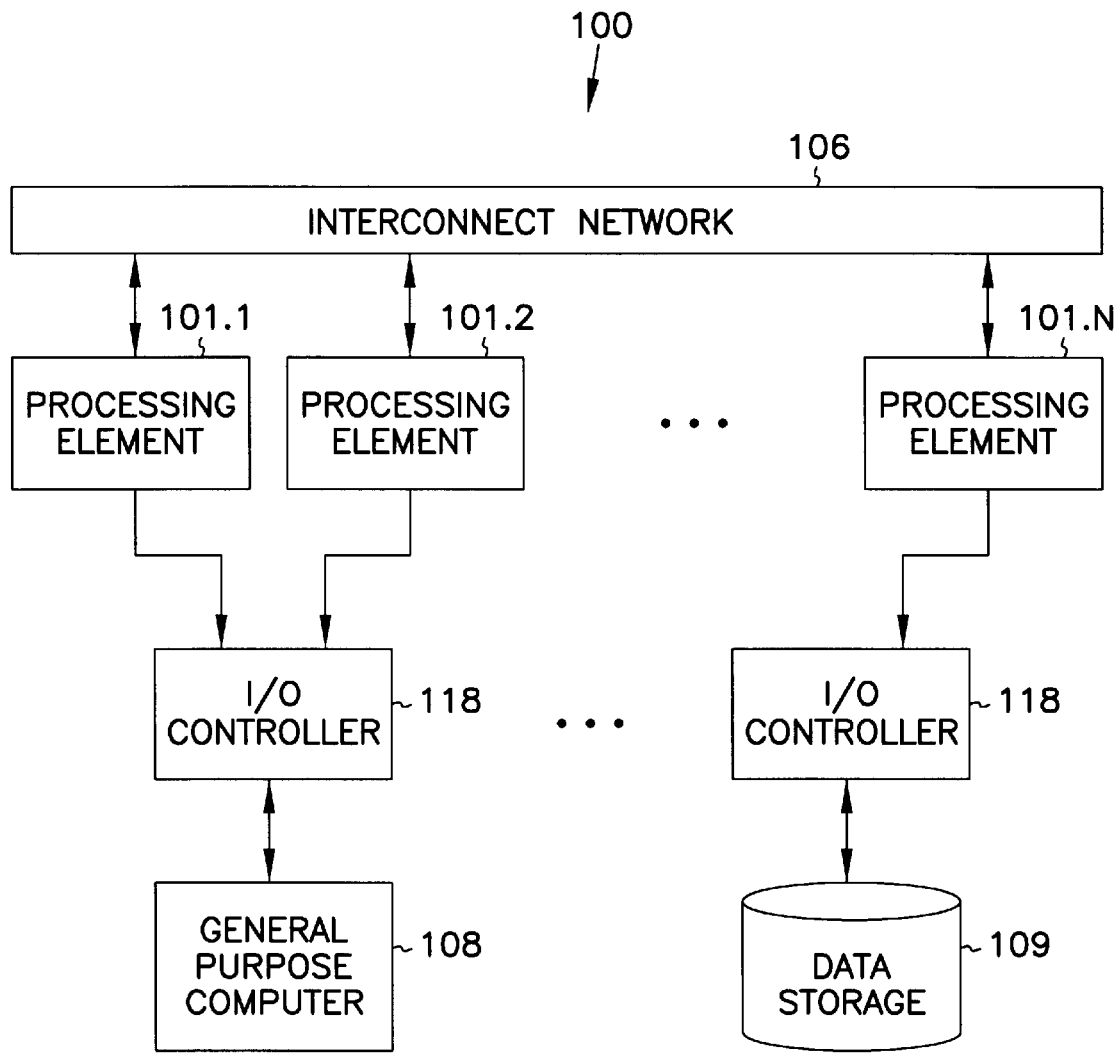
FIG. 3 shows a simplified block diagram of a representative MPP system.

E-registers 26 can also be used to extend the addressing capability of commodity microprocessors in a massively parallel processor (MPP) system. One such MPP system is shown in FIG. 3. MPP system 100 contains hundreds or thousands of processing elements 101; each processing element 101 comprises a processor 102 connected to a local memory 104. The PE's in MPP system 100 are linked via an interconnect network 106.

In one embodiment, system 100 is a MIMD massively parallel processing system with a physically distributed, globally addressable memory. Each processor 102 has a favored, low latency, high bandwidth path to a local memory 104, and a longer latency lower bandwidth access to the memory banks 104 associated with other processors 102 over the interconnect network 106. In the preferred embodiment, the interconnect network 106 is comprised of a 3-dimensional torus which, when connected, creates a 3-dimensional matrix of PEs. The torus design has several advantages, including high speed information transfers and the ability to avoid bad communication links. A toroidal interconnect network is also scalable in all three dimensions. Interconnect networks of this nature are described in more detail in the following copending and commonly assigned U.S. patent applications: U.S. Pat. No. 5,533,198, entitled "DIRECTION ORDER ROUTING IN MULTIPROCESSING SYSTEMS", by Gregory M. Thorson, issued Jul. 2, 1996 and U.S. Pat. No. 5,701,416, entitled "ADAPTIVE ROUTING MECHANISM FOR TORUS INTERCONNECTION NETWORK", by Thorson et al., issued Dec. 23, 1997, both of which are incorporated herein by reference.

Figure 4:
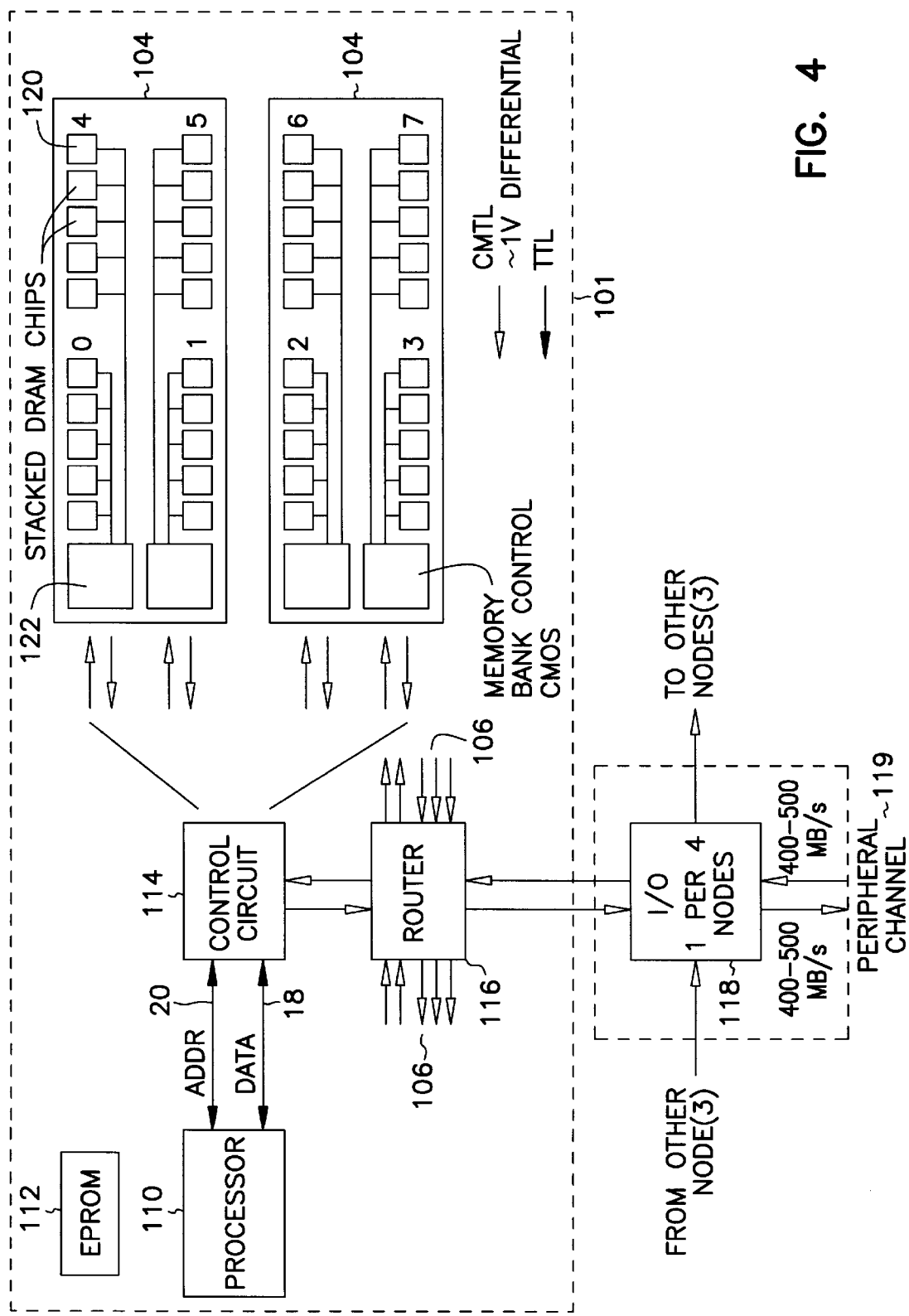
FIG. 4 shows a block diagram of a processing element (PE), including a processor, its associated shell circuitry, and local memory.

FIG. 4 shows a simplified block diagram of one embodiment of processor element 101. In this embodiment processor element 101 includes a high-performance RISC (reduced instruction set computer) microprocessor 110 such as the EV5 microprocessor or the EV56 microprocessor, both available from Digital Equipment Corporation. Each microprocessor 110 is coupled to a local memory 104 that is a distributed portion of the globally-addressable system memory. Local memories 104 may be formed, for instance, by stacking a plurality of DRAM integrated circuits 120 configured as banks of memory operating under control of memory bank controllers 122. Microprocessor 110 is also connected to a nonvolatile memory 112 used to store relatively unchanging information such as, for instance, boot program code.

Each PE 101 further includes a shell of circuitry that implements synchronization and communication functions facilitating interactions between processor elements 101. The shell circuitry includes external registers circuit 114 and an interconnection network router 116 used to connect multiple PEs 101 in a three-dimensional toroidal "fabric". The toroidal interconnect network carries all data communicated between PEs 101 and those memories 104 that are not local to the particular PE 101. In one embodiment, external registers circuit 114 permits asynchronous (i.e., independent of the local processor) movement of data, including blocks of data, between processor 110 and remote memories 104 associated with other PEs 101 and between local memory 104 and remote processors 110 associated with other PEs 101. In addition, external registers circuit 114 can be used to provide flexible addressing modes that permit a high degree of control over the redistribution of data between shared portions of the system memory.

As is shown in FIG. 4, the shell circuitry may also include an input/output circuit 118 used to communicate over a high-speed channel with one or more input/output devices (not shown). Such a high-speed channel is discussed in RECONFIGURABLE RING-BASED NETWORK SYSTEM, U.S. patent application Ser. No. 08/614,860, filed Mar. 13, 1996.

In one embodiment of the system shown in FIG. 4, a memory location in the memory 104 local to a particular PE can be accessed in two ways: a direct (cacheable) load or store by the processor, or an indirect (non-cacheable) operation through the E-registers. The virtual address used to access the memory location can be the same in both cases. Processor load and store instructions can reference only local memory. An on-chip DTB translates the virtual addresses to local physical addresses when the processor directly issues loads and stores. The shell circuitry translates the virtual address to a (either local or remote) physical address when the processor issues E-register GET and PUT references.

All direct loads and stores to memory are cacheable. All E-register references are non-cacheable. Since cacheable loads and stores can only reference local memory, cache coherence support is only required for the local cache relative to the local memory. Coherence will be maintained by using the back-map interface. The backmap contains a list of the physical addresses associated with the contents of a secondary cache kept within processor 110. (The primary cache contents are a subset of the secondary cache contents.) All E-register references consult the backmap before referencing the memory banks. If the referenced data could be in the secondary (or primary) cache, the shell circuitry initiates a transaction to withdraw the data from processor 110. The backmap address tags may be only partial tags; the tags need only be wide enough so that most E-register references that are not in the secondary cache do not unnecessarily probe processor 110. Our analysis suggests that the backmap tags need to be at minimum 8 bits wide for this.

A standard virtual address space is available to each process. One possible mapping of the virtual address space is shown in FIG. 14. In one such embodiment, each user program can directly access up to eight virtual segments (VSEGs) within its 35-bit address space, with each segment representing up to 2 GB. For instance, the user may utilize one VSEG for the private code, data, and stack regions, and another VSEG for the shared stack and the shared heap regions. The MBZ (must be zero) bits do not participate in the address translation.

Although each user-program can immediately access only eight virtual segments, in one embodiment a system segment (SSEG) space size of 64 provides multiprogramming flexibility. Each user-program is allocated a number of SSEGs; if the segments are distributed (shared) across multiple processors the same segment identifier must be used across all the processors. Provided that there are enough system segments, independent parallel user-programs can be executing simultaneously without interfering with each other.

The 38-bit system virtual address has the same offset field format as the user virtual address, but bits 32–37 signify the system segment, rather than the user virtual segment.

Figure 5:
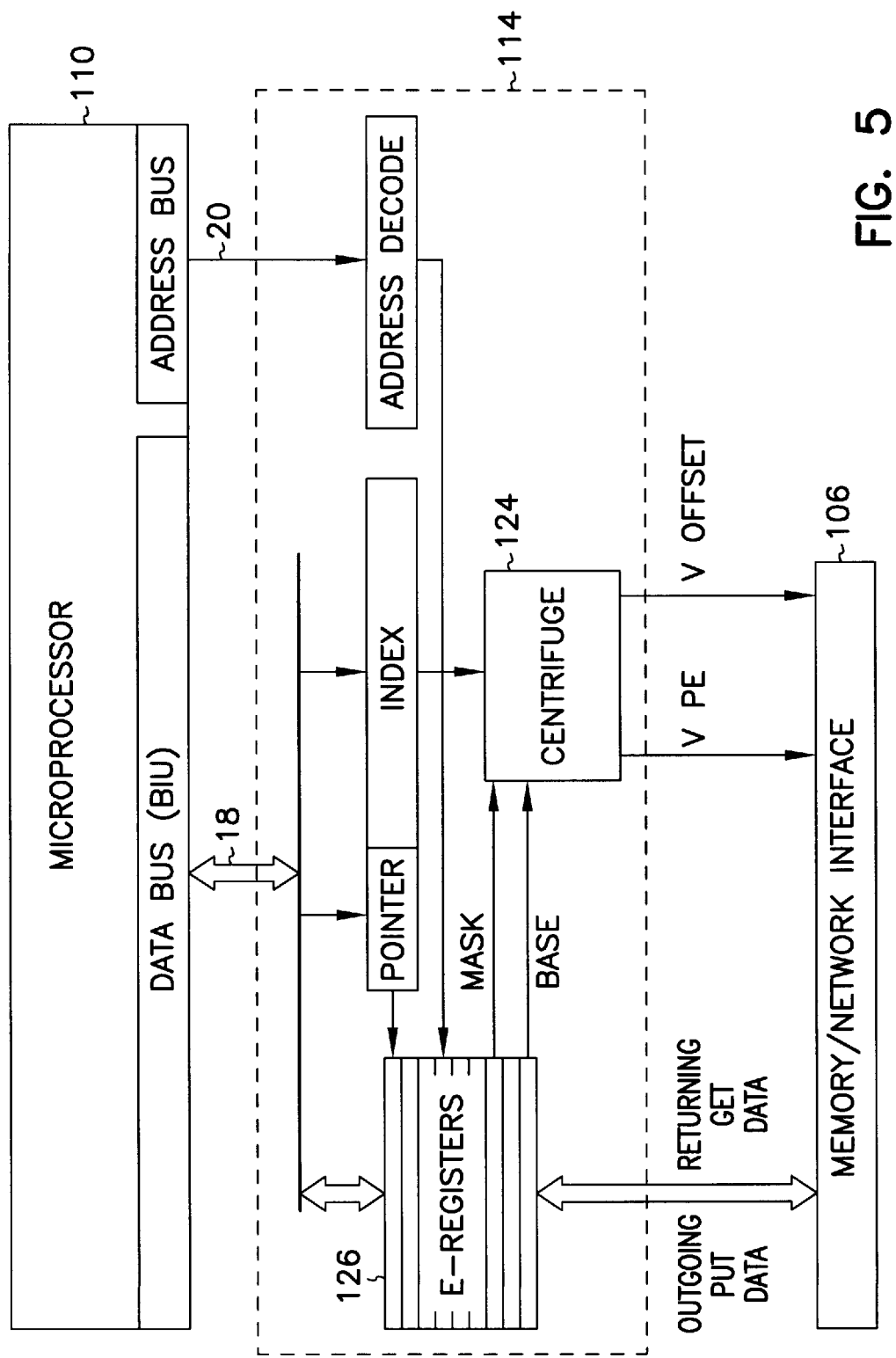
FIG. 5 shows a block diagram of a processing element (PE) having an address centrifuge.

In one embodiment, such as is shown in FIG. 5, external registers circuit 114 includes a hardware-implemented address centrifuge 124 used to convert a global address into a PE number and offset associated with a particular local memory 104. One such hardware-implemented address centrifuge is described in U.S. patent application Ser. No. 08/165,118 entitled "SYSTEM AND METHOD OF ADDRESSING DISTRIBUTED MEMORY WITHIN A MASSIVELY PARALLEL PROCESSING SYSTEM", filed Dec. 10, 1993 by Oberlin et al., the description of which is hereby incorporated by reference.

The address centrifuge implementation distributes array data across local memories 104 of different processors 102. In the embodiment shown in FIG. 4 address centrifuge 124 is an integral part of the addressing path. The information necessary to generate the remote address comes from an index contained in a word written to the data path and from the centrifuge mask and base offset (extra arguments required to implement the address centrifuge). These arguments are stored in a block of E-registers 126 (the mask-offset block or MOB) indicated by a pointer field in the argument data. The centrifuge mask indicates the bits of the index that determine the processor element 101 where the memory location exists; the remaining bits determine the offset.

Use of an external address centrifuge eliminates the need for software centrifuging of remote addresses. The mask value read from the E-register indicated by the pointer field controls the centrifuge of the index. The base offset is added to the resulting offset that emerges from the centrifuge. Later, the resulting virtual offset is translated to a physical offset, and the virtual PE number is translated to a physical PE number.

Figure 6:
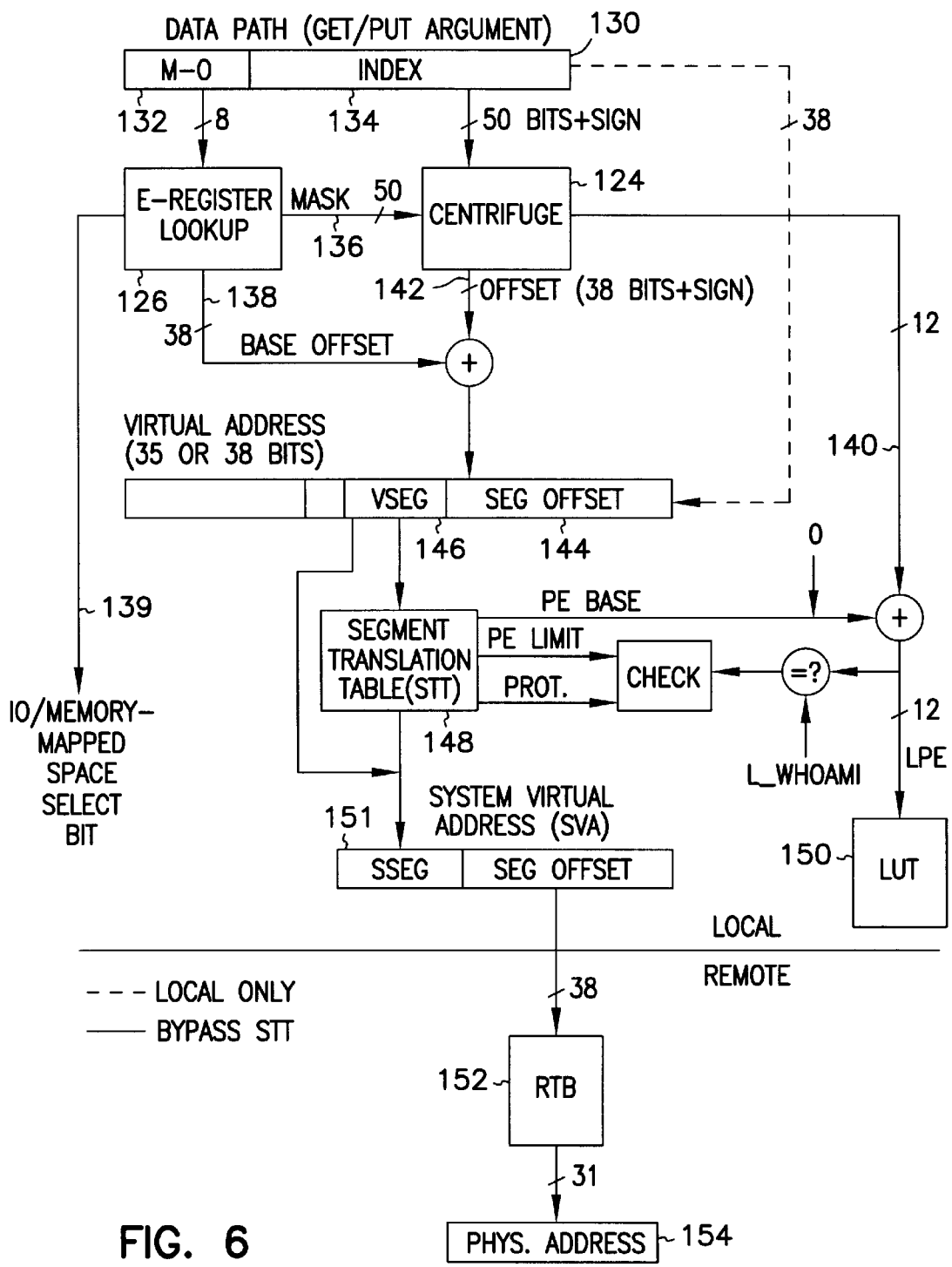
FIG. 6 is a more detailed depiction of one embodiment of the system of FIG. 5

FIG. 6 is a more detailed depiction of one embodiment of the system of FIG. 5. On each E-register reference microprocessor 110 supplies a data word 130 to control circuit 114 via data bus 18. At around the same time, microprocessor 110 places an address on address bus 20 which indicates that an external memory reference is to occur. Data word 130 includes an MOB field 132 and an index field 134. MOB field 132 is used to select one or more E-registers 126. In one embodiment MOB field 132 is a four word block of E-registers 126. In one such embodiment, one of the MOB E-registers 126 contains a centrifuge mask word 136 previously stored by microprocessor 110. Another contains a base offset 138. Address centrifuge 124 takes centrifuge mask word 136 and index field 134 and generates a PE number 140 and an offset 142. Base offset 138 is added to offset 142 to produce a segment offset 144. In one such embodiment, as is shown in FIG. 6, index field 134 contains a signed integer.

An example of the address translation flow on an E-register reference will be discussed next. In a PUT or GET instruction which will result in a global memory reference (i.e., a reference to local memory 104 of a remote PE 101), an argument comes out of data path 18 which includes the MOB pointer 132. (The implementation may cache a certain number of MOBs rather than read them from the E-register file each time. A cache of just a few entries may be sufficient since only one base offset per array should be necessary.) Mask word 136 is supplied to address centrifuge 124 together with the signed index from index field 134. Centrifuge 124 produces two outputs—the virtual PE (VPE) of 12 bits (PE number 140) and the offset of 38 bits plus a sign (offset 142). Base offset 138 is added to offset 142 from centrifuge 124. That produces the final system segment (SSEG) offset that will be used to index into the appropriate SSEG.

E-registers 126 can also have a local-only addressing mode. This mode bypasses the centrifuge and address translation mechanisms; (local) virtual addresses (system or user) come directly out data path 18 as the PUT/GET argument; all PE translation is avoided, and there is no base offset add.

VSEG field 146 (from the sum of the base offset and the offset output of the centrifuge) indexes directly into a segment translation table (STT) 148 that, among other things, determines the SSEG corresponding to the given VSEG. FIG. 15 depicts an STT entry.

STT entry 180 contains four fields. PE Base field 182 and PE limit field 184 provide the PE protection for distributed segments, which are ignored in the local-only case. PE limit field 184 indicates the maximum logical PE (LPE) number while PE Base field 182 is added to VPE to produce the LPE number.

Since each VSEG has its own PE base and limits, each segment referenced by the user program can be distributed differently. For instance, this can enable segment sharing by multiple applications that run on different processors. SSEG field 186 contains the system segment corresponding to the given VSEG. PROT field 188 determines the access-rights that the user-program has for the segment indicated in SSEG field 186. There will be separate protection rights to access the local portion of the distributed segment (if present), and any remote portions of the distributed segment. After determining if the resultant logical PE is local or not, the hardware will apply either the local or remote permissions. The permissions include read-only, read-and-write, and no-read-or-write.

In one embodiment, system software can bypass the STT translation mechanism. Special GETs and PUTs (usually accessible only by the system) will interpret bits 37–32 of the virtual address shown in FIG. 14 as a SSEG (rather than interpreting bits 34–32 as the VSEG). There are no STT protection checks on these references, and the PE base add function is disabled.

After the centrifuge operation and the STT lookup, the E-register request is ready to cross the network. A local PE identifier register (L_WHOAMI) contains the logical node ID of the local PE. By comparing the L_WHOAMI register to the LPE result of PE translation, the hardware determines if the reference is local or remote. If it is remote, the hardware sends the request over the network (by consulting LUT 150 for routing directions). The network request contains the SSEG that was extracted from the STT along with SSEG offset 144. The combination of the SSEG and SSEG OFFSET yields system virtual address (SVA) 151.

Translation from system virtual address to physical address occurs at the PE containing the physical memory being accessed. The system virtual address 151 (either produced by a local or remote GET or PUT) is converted into a physical address by means of a remote translation buffer (RTB) 152. RTB 152 contains at least sixteen variable page size entries. The incoming SVA 151 is compared against all entries in RTB 152. If there is a match with one of the entries, the matching entry outputs the result. If none of the entries match, RTB 152 must consult a memory location in the DRAM memory banks to complete the translation. RTB 152 concatenates bits from the SVA with bits from the RTB entry array base (RTB_EA_BASE) register and completes a (32-bit) DRAM load.

In one embodiment, the total size of the RTB_EA in DRAM can vary from 128 to 1024 kilobytes. FIG. 16 depicts one exemplary RTB_CTL_EA_SIZE encoding 189 used to select the size of the RTB_EA in DRAM. The RTB_EA entry that services RTB 152 misses is RTB_EA_BASE [13:size] @ SSEG[5:0] @ OFFSET[27+size:19], where @ represents concatenation, SSEG represents the SSEG of the RTB miss, OFFSET represents the SSEG OFFSET, and size represents the value of RTB_CTL_EA_SIZE. Range errors will occur if any of the bits OFFSET[31:28+size] are non-zero. RTB 152 does not translate addresses with an SSEG equal to zero; they pass directly through. It should be noted that the hardware may produce an unpredictable result if more than one of the RTB entries matches the incoming system virtual address.

FIG. 17 depicts an RTB array entry (RTB_EA) 190. RTB_EA 190 contains an entry for each 512 KB page from the system virtual space. RTB 152 provides fully-flexible support for page sizes of 512 KB up to 128 MB. It also supports page sizes as small as 64 KB, provided the smaller pages are aligned on 512 KB boundaries in the virtual address space. (The smaller pages do NOT have to be aligned on 512 KB boundaries in the physical memory.) Page frame number (PFN) field 192 indicates the upper 15 bits (bits 16–30 of a byte address) of the resultant physical address 154. MASK field 194 determines the page size. In one embodiment, for instance, a MASK value of all ones selects the 64 KB page size and all zeroes selects a 128 MB page size. In one such embodiment, the hardware is simplified by requiring that the upper bits of the MASK field must always be ones and the lower bits should always be zeroes. The hardware behavior when this rule is violated is, however, unpredictable. The number of zero and one bits determines the page size.

U bit 195 provides the support for the smaller page sizes. There can be only one valid small page in each 512 KB segment of the system virtual address space. This valid small virtual page must be either the lower-most (offset within a 512 KB page is all zeroes) or upper-most (all ones). U bit 195 selects between upper-most and lower-most. This implementation provides system software the flexibility to allocate the boundaries of virtual regions in page sizes as small as 64 KB in order to more efficiently allocate physical memory, yet limits the number of RTB-EA entries to one per 512 KB page of the supported virtual address space.

V bit 196 is the valid bit. An RTB miss that loads an entry with V bit 196 clear will cause an error return value.

Figure 18:
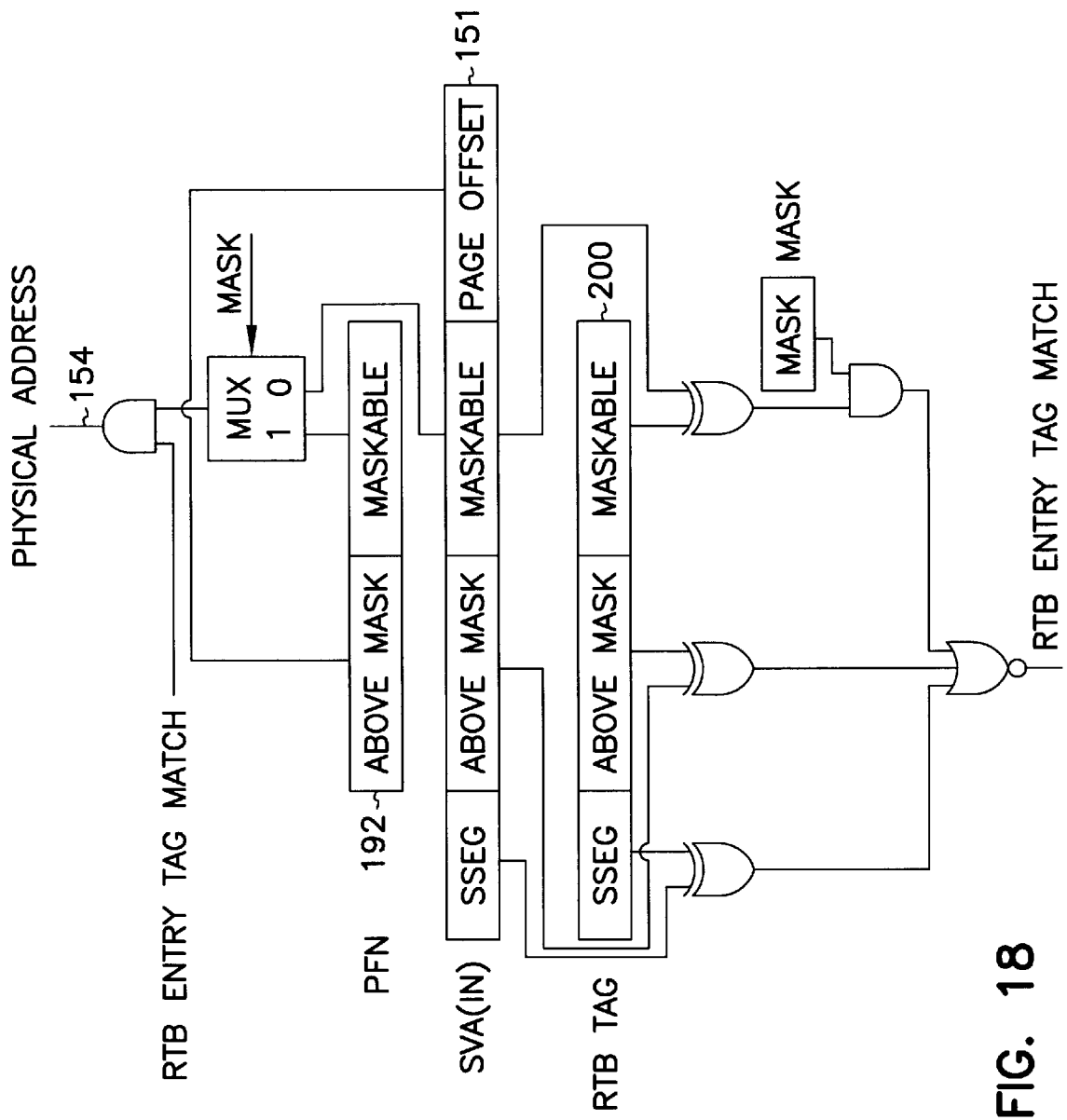
FIG. 18 depicts the operation of a single RTB entry.

FIG. 18 depicts the operation of a single RTB entry 190. The input SVA 151 is compared to the stored RTB tag 200 to determine if there is a tag match for this entry. The maskable bits only conditionally participate in the comparison, depending on the value of the mask. Provided there is a match, PFN bits 192 are gated out as the resultant physical address. Some of the resultant PFN bits 192 are conditional depending on mask value 194.

System software should use the large page sizes to ensure good system performance for workloads with little locality (e.g. large scientific programs). The sixteen entry RTB 152 is capable of addressing the entire 2 GB local memory space provided the largest page sizes are used, but thrashing could occur with the smaller pages. RTB thrashing is potentially more damaging than thrashing in the on-chip DTB. Thrashing at only a single RTB 152 could cause poor performance for the entire system since the network may be blocked while RTB reloads are occurring. Consequently, it is essential that the system software guard itself against poor-locality programs by closely monitoring RTB performance. In one embodiment, hardware-based performance counters indicating the frequency of RTB reloads are used to aid this monitoring. Analysis has shown that RTB page miss ratios of 0.01 or less will have minimal performance effects.

One embodiment supports two RTB operations: invalidate all entries, and invalidate a single entry (given a page address). Other RTB operations can be defined as needed.

In one embodiment, E-registers 126 are provided for a plurality of contexts. In such an embodiment, processor 110 must be aware of the desired context and address external registers circuit 114 accordingly. In one embodiment, for example, circuit 114 has a user context and a system context. E-registers 126 allocated to the user context are generally used for user-level codes while E-registers 126 allocated to the system context will generally be system privileged. Additional contexts can be implemented as needed.

In one such embodiment, the user context has 512 registers while the system context is limited by space constraints to only 128 registers. In one embodiment, E-registers 126 are organized as an array of 72-bit words of RAM file storage. The array is constructed out of smaller RAM block macros so that it can operate as multiple independent banks of memory. The lower E-register bits specify which bank is being addressed (i.e., the banks are interleaved on a word-wise basis). Separate and independent read and write ports can be provided to each bank to increase the memory access rate. In a system in which LOADs, STOREs, local GETs, and local PUTs can all access the E-registers array at a rate of approximately two words per system clock, there should be a minimum of four banks. Additional banking would help to disperse contention effects from Mask/Offset Block (MOB) fetches and other sources of contention.

Figures 7, 8, 9:
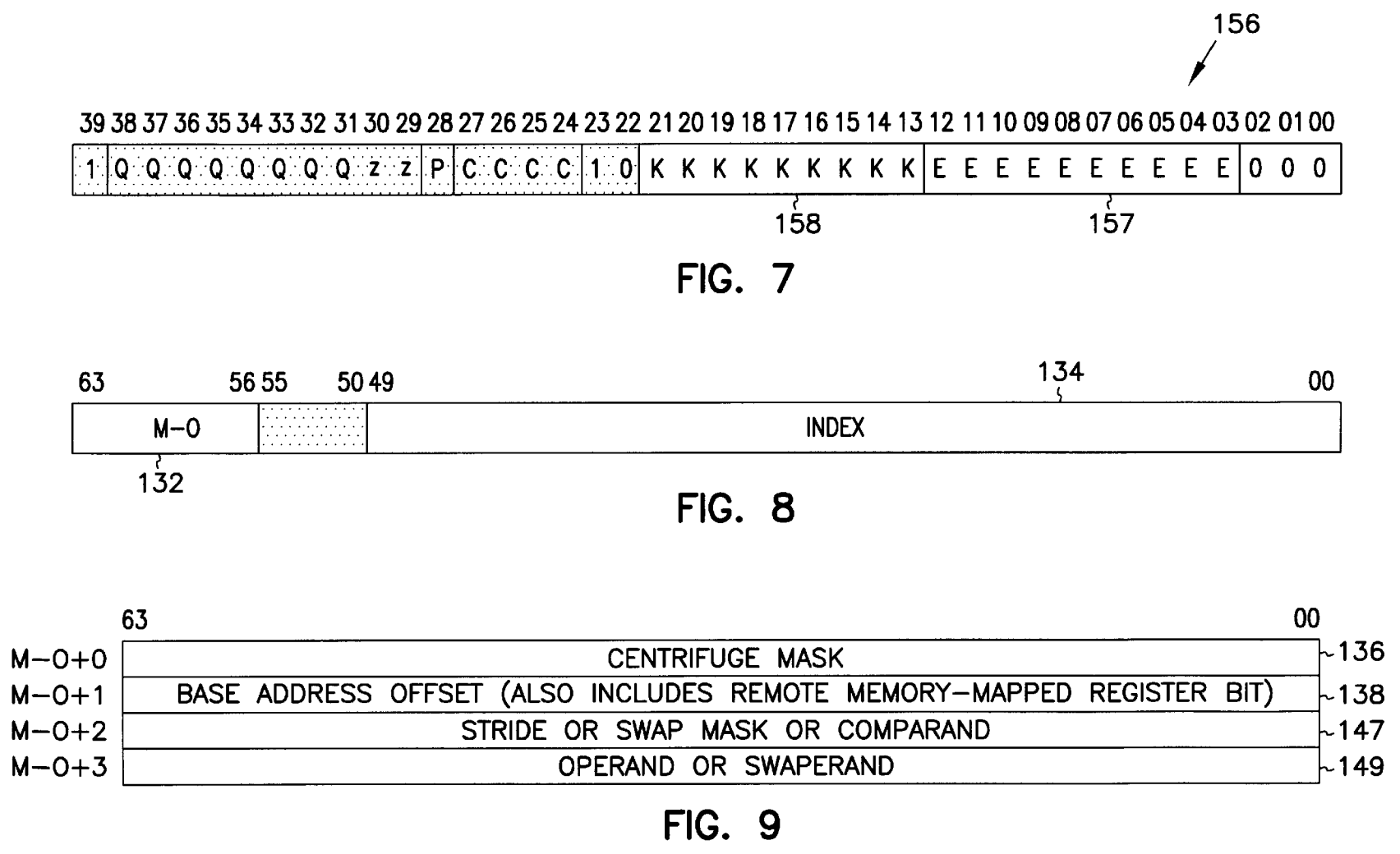

FIG. 7 shows memory mapping scheme which can be used to provide an E-register instruction to circuit 114. In the embodiment shown, address 156 is divided into two key sections: target E-register identifier 157 (bits 3–12) and a command code field 158 (bits 13–21). Bits 0–2 are usually set to zero (each E-register 126 is 64-bits). Target E-register identifier 157 specifies the source/destination E-register for the E-register operation. The ten bits used in the embodiment shown in FIG. 7 provide 1024 E-registers per E-register context. For some commands, target E-register identifier 157 is shifted right to facilitate sequential address processing.

In addition to the above two sections, the address shown in FIG. 7 includes one bit (bit 39) used to indicate whether the operation is taking place in cached or non-cached address space ("1"=non-cached) and one bit (bit 28) used to show system privilege. In addition, bits 27–24 select one of sixteen contexts and bits 23 and 22 are used to indicate the type of command. (Specifically, if bits 23 and 22 are a "1" and a "0", respectively, the instruction is an E-registers command. Note that target E-register identifier 157 and command code field 158 fit within a standard 4 MB memory page. This minimizes DTB usage required for E-register operations.

The privilege, context and memory space bits lie within the translated field of the virtual address, allowing the system to control access to each of the E-register contexts using the DTB.

Command code field 158 specifies the operation to be performed. Bits 22–29 are special since they are protected above the largest page boundary; in this case they indicate that the E-registers are being referenced, select the E-register context, and indicate whether the operation performed with this address is privileged or not. There are several key aspects of this encoding that make it efficient for commodity processors. First, consecutive E-registers 126 are referenced with consecutive addresses. Since microprocessors 110 typically provide faster access to adjacent addresses than to widely-distributed addresses, this leads to efficient access to adjacent E-registers 126. Second, most of the major opcodes reside in the lower portion of command code field 158. This is useful since these address bits plus the source/destination E-register identifier 157 are easily changed by the typical indexed load and store instructions available with microprocessors 110. (An indexed load uses a constant encoded in the instruction plus a register value to produce an address. In this case, the constant that is encoded in the instruction selects both the E-register and the major opcode of the command code.)

Most of the major opcodes are encoded in the lower bits of the command code. The upper bits of the opcode select the more detailed type of command. For instance, one of the bits typically chooses between a 64-bit operation and a 32-bit operation. Another specifies whether the address is to be centrifuged or not. Another allows system programs to bypass the virtual address translation. Another chooses the ordering constraints of the request: ordered or unordered. All ordered requests sent by the same processor to the same memory location appear as if they executed in the order that they were issued. Unordered requests may complete in any order. For messages, the rules are slightly different. Ordered messages to the same message queue from the same processor appear in the message queue in the order they were sent.

In one embodiment, the hardware provides no ordering assumptions for the unordered E-register requests; even GETs and PUTs to the same address may be reordered by the hardware. To use the unordered requests, software must insert appropriate synchronization to ensure correct behavior.

For the ordered E-register requests, hardware within circuit 114 ensures that all references to the same memory location by the same processor 110 appear as if they executed in the order they were issued. References to different addresses may be reordered by the hardware. (In embodiments issued on microprocessors such as the EV5, the "issue" order is the order the addresses appear from the processor 110. Since the EV5 reorders stores, without appropriate synchronization—via the EV5 write barrier instruction—GETs and PUTs may not be executed in the same order that the EV5 stores issue.)

In the EV5 embodiment, the hardware provides no guarantees about the ordering of E-register GETs and PUTs with respect to local (cacheable) loads, nor are there any guarantees about the ordering of (non-cacheable) E-register loads with respect to GETs and PUTs. An MB instruction flushes the EV5 write buffer; this solves the ordering problem of GETs and PUTs with respect to E-register loads. In addition, the hardware maintains an outstanding PUT counter for each E-register context. An EREG_PENDING register indicates the sum of the outstanding PUTs for each of the contexts. To force an ordering of PUTs (or GETs) with respect to cacheable loads, software must also explicitly wait for completion of all issued PUTs (or GETs) by querying EREG_PENDING. (Alternatively, one could be sure that GETS are processed in a predetermined sequence by tracking each GET with E-register LOADS or ERS_READs.)

Ordered SENDs to the same message queue control word (MQCW) originating from the same processor occur in the order that they were sent. Unordered SENDs may not.

In one embodiment circuit 114 includes be an E-register request queue (E_QUEUE) capable of absorbing some number of E-register block writing (WRITE_BLOCK) requests. This is so processor 110 may proceed issuing E-register commands even though the external circuitry may not service the requests as fast as the processor is issuing them. An E-register request queue entry should include storage for the physical address bits that contain the command and target E-register pointer as well as storage for data arguments.

In one embodiment, E_QUEUE is a FIFO structure used to buffer multiple E-register directed commands. All processor 110 to E-register directed WRITE_BLOCK operations are enqueued in this FIFO as they emerge from processor 110. Only E-register LOAD and ERS_READ operations are not enqueued but instead are processed immediately.

In one embodiment, processor 110 LOADs from E-registers 126 are not processed until all prior E-register commands have been placed on the E_QUEUE (and thus have completed their own interrogation of the cache). In such an embodiment, LOAD related cache line allocation is guaranteed not to interfere with other ERS flag requester-side activities. MOB flag checks and source/destination flag checks do, however, contend with each other when both miss in the cache. In these cases, when both request new line allocations, the MOB will be allowed to go first.

The E_QUEUE structure consists of at least sixteen 86-bit words of RAM storage. Each 86-bit word in the single-read/single-write ported RAM consists of a 21-bit address/command field and a 64-bit data field and a parity bit.

E-register directed WRITE_BLOCK operations (commands) are placed in the E_QUEUE structure to be presented to an E_CMD request generation pipeline. Prior to entering the E_QUEUE, required E-register resources (MOB registers and data source or destination registers) are checked for availability and disqualifying error conditions. Assuming all resources are available, the E-register commands enter the E_QUEUE. They will subsequently be removed from the E_QUEUE by the E_CMD pipeline in the order in which they originally issued to the queue.

As a command arrives at the front of the E_QUEUE structure, it is examined by the E_CMD functional block to determine what type of request it is. Depending on the type of command, the E_CMD block must retrieve MOB values from the E-registers, perform address translation, check for access violations and either fetch data (for PUTs, SENDs, or atomic operations (A_OPs)) from the E-registers or store processor 110 sourced data to the E-register array.

In the case of the STORE_CENT command, processor 110 sourced data is passed through the centrifuge portion of the address translation circuitry before being stored to the indicated E-registers. STORE_PLZ has its own dedicated pipelined functional unit. Both STORE_PLZ and STORE_CENT results contend with normal STOREs for a write port into the E-registers.

In the preferred embodiment of circuit 114, GET's are allowed to issue speculatively. That is, memory range or permission errors do not trigger interrupts immediately; they instead put E-register 126 in state FULL_F which may later cause an interrupt. This allows GET's to issue in a loop, for example, prior to index testing for loop completion in order to allow the maximum data prefetch time. The E-register state may subsequently be changed from the FULL_F state by a legal GET, STORE, ERS_WRITE, or other operation.

To preserve the order of E-register operations, it is necessary for hardware to check the E-register state (ERS) code for target E-registers (and for those E-registers indicated by MOB field 132) prior to placing most E-register commands into E-register request queue E_QUEUE. If an E-register is EMPTY, and the command would set it EMPTY if it issued, it must first wait for the earlier operation to complete setting the register FULL again. If an E-register is a source of data for the operation, the E-register state code must be either FULL_SR or FULL or the operation will stall. The operation should be aborted (and appropriate error flags set), if a source E-register has been marked FULL_F.

Destination E-register state codes are set EMPTY as the command is accepted from the processor bus into E_QUEUE.

When a command reaches the head of the queue, it is not necessary to recheck the E-register state code for any operand E-registers: It is quite possible that some have been set EMPTY by commands that lie farther back in the queue, but until the later command actually reaches the head of the queue the data in the E-register remains intact.

Automatic merging of stores in processors such as the EV5 can be used to advantage. The automatic merging of stores in the EV5 write buffers allows multiple similar commands to be delivered to the trigger locations in a single bus cycle. In many cases, this capability can provide a four times improvement in data bandwidth for processor 110 transactions. Some E-register commands (e.g. GETV and PUTV) which act upon more than a single E-register require the E-register identifier to be right shifted in order for multiple commands to merge.

FIG. 8 shows the format of the information transferred on data bus 18 of FIG. 5 when the E-registers are used in centrifuged addressing mode. The bottom bits are index field 134; they specify the (signed) index that is fed into the centrifuged unit. The upper 8-bits are MOB field 132. This field is a pointer to a block of E-registers 126 that hold arguments used in performing the E-register instruction. In non-centrifuged addressing mode, the index stored in index field 134 is simply a virtual address; the same kind of virtual address as used by normal loads and stores.

An example of an aligned block of arguments which could be used in a centrifuged memory reference is shown in FIG. 9. In the example shown in FIG. 9, MOB field 132 is a pointer into aligned blocks of four E-registers 126. The block of four E-registers includes a register used to store centrifuge mask word 136, a register used to store base offset 138, and two registers used to store supplemental arguments 147 and 149, which are used for certain instructions. Centrifuge mask word 136 and the base offset are the first two arguments; these arguments are used when the addresses are centrifuged. The second group of two words in the MOB are generally the extra operands required for such things as atomic operations. The exception here is the stride operand used for GETV's and PUTV's (vector GET's and PUT's). In one embodiment, the stride used for GETV's and PUTV's is a 50-bit sign-extended value. No checking is performed to ensure that the stride does not cause the index to "wrap around" during a vector operation as long as the resulting index is legal.

FIG. 10 is a table listing some of the major E-register commands. Note that it may be advantageous, as is shown here, to have all commands support both the 4 byte and 8 byte forms. In the table in FIG. 10, A in the command argument indicates the address placed on address path 20, D indicates data (either 32 or 64 bit data), P indicates a pointer to an aligned block of E-registers containing a centrifuge mask, base address offset and any other supplemental arguments needed for the operation being performed and "I" is an index formed by combining the bits of the PE number with the offset (or is simply the local offset in the case of local-only operations). The commands GET, PUT, ERS_READ, and ERS_WRITE were mentioned previously. Note that, in the embodiment shown, the ERS_READ and ERS_WRITE commands shift source or destination E-register identifier 157 to the right by five bits (since they access ERS codes for 32 E-registers 126 at a time). PUTV and GETV commands operate the same as PUT and GET commands except they operate on vectors of length 8 with a constant stride; the memory locations (indices) are arbitrary (constant) stride but the target E-registers 126 are adjacent (i.e., in GETV and PUTV source or destination E-register identifier 157 is shifted to the right by 3 bits to force it to be an aligned block of 8 E-registers). The atomic operations and special operations are shown in FIGS. 11 and 12, respectively.

SEND launches a 64-byte message that has been assembled in an aligned block of E-registers. Target E-register identifier 157 is also shifted as with GETV and PUTV. We discuss the details of the SEND command later.

FIG. 11 shows a set of atomic operations which can be performed on memory 104 via E-registers. The atomic operations shown function much like GET's, except that they also perform atomic updates of memory locations in memory 104. In the table in FIG. 11, "A" in the command argument indicates the address placed on address path 20. "PI" indicates a pointer and index, where pointer P is a pointer to an aligned block of E-registers containing a centrifuge mask, base address offset and any other supplemental arguments needed for the operation being performed and where index I is an index formed by combining the bits of the PE number with the offset (or is simply the local offset in the case of local-only operations). "S" indicates a pointer to an aligned block of E-registers containing a centrifuge mask, base address offset and a pair of source arguments needed for the operation being performed and "Q" indicates a pointer to an aligned block of E-registers containing a centrifuge mask, base address offset and a source argument needed for the operation being performed.

GET_INC fetches the contents of a memory location while also incrementing the contents with an atomic increment of one. GET_ADD fetches the contents of a memory location and atomically adds an arbitrary value to the memory location. MSWAP has two arguments: a swap mask and a swaperand. It returns the current value of the memory location addressed and atomically swaps in the bits of the swaperand that are enabled by the swap mask. CSWAP requires a comparand and a swaperand. CSWAP returns the current value of the memory location and, if the current value of the memory location equals the comparand, swaps in the swaperand.

In order to perform these functions effectively, external registers circuit 114 must include the necessary arithmetic functions to perform the additions and comparisons. At the same time, circuit 114 must also include a mechanism for ensuring that an atomic operation will be completed before another operation on the same location is allowed.

E-register operations can also be used to augment the instruction set provided for the microprocessor. Examples of instructions which can be used to augment the capabilities of microprocessor 110 are shown in FIG. 12. The instructions listed function differently from the GET and PUT instructions discussed above in that they take advantage of additional logic placed within external registers circuit 114 to speed execution of certain processes. For instance, the STORE_PLZ acts much like the STORE command, except that instead of just storing the data into an E-register 126, circuit 114 performs a popcount and (simultaneously) a leading-zero computation on the data and stores the result into the target E-register 126. STORE_CENT performs the address centrifuge operation on the data/address that comes out data path 18 and stores the result into the target E-register 126. The address being centrifuged by a STORE_CENT comes out much like a GET or PUT, but no memory operations are performed. With both the STORE_PLZ and STORE_CENT commands, the result can be retrieved from the target E-register 126 by a later LOAD. Other instructions can be defined as necessary based on an analysis of the cost of adding the additional complexity versus the gain in execution speed for the function implemented.

E-register GETs are speculative. That means that a GET to an invalid memory location may occur normally during the operation of a correct program. This does not result in an immediate error message. Instead, reporting of this situation may be deferred until processor 110 tries to LOAD from target E-register 126. It is not necessarily an error to GET an invalid memory location, the destination E-register state code is simply set to FULL-F and the E-register is filled with information describing the speculative error. (Only those elements of vector GET's (i.e., GETVs) that cause speculative errors will set their corresponding state code to FULL_F.)

There are two modes that control the behavior of the system on speculative GET's: fault-on-load, and no-fault. In fault-on-load mode, it is an error to load from an E-register with an ERS code of FULL_F. In no-fault mode, it is not an error to load from an E-register with an ERS code of FULL_F. In both cases, the load will not return the contents of any memory location; it will instead complete, returning the error information describing the speculative error. And when in fault-on-load mode, processor 110 will be interrupted via a processor interrupt when an attempt is made to load an E-register having an ERS code of FULL_F.

Other E-register errors are not deferrable, including some GET errors. For example, invalid PUTs are aborted before they write data into the memory banks. Information describing the error is loaded into the appropriate error logging register of the source processor and the source processor is interrupted.

Atomic operation errors are also not deferrable and act like both a GET and a PUT error. The hardware sets the target E-register's ERS code to FULL_F and fills the target E-register with the error information. It also loads the appropriate error logging register with the same information and interrupts the processor.

Messaging Facility

Special message packets can be sent via E-registers 126. In one embodiment, message queues stored in circuit 114 are generalized to be completely memory-mapped, allowing the creation of multiple queues by user or system code. Such an approach allows the user or system to define an arbitrary number of (user or system level) message queues; each can be of variable size and have selectable interrupt thresholds. Furthermore, each individual queue can start at any legal address and be any size (in one embodiment, however, queue sizes cannot exceed 64 MB). To do this, a control word is defined for each message queue. The control word describes the current state of the queue, including: the message queue size (limit), interrupt threshold, and the current queue position (tail).

Figure 13:
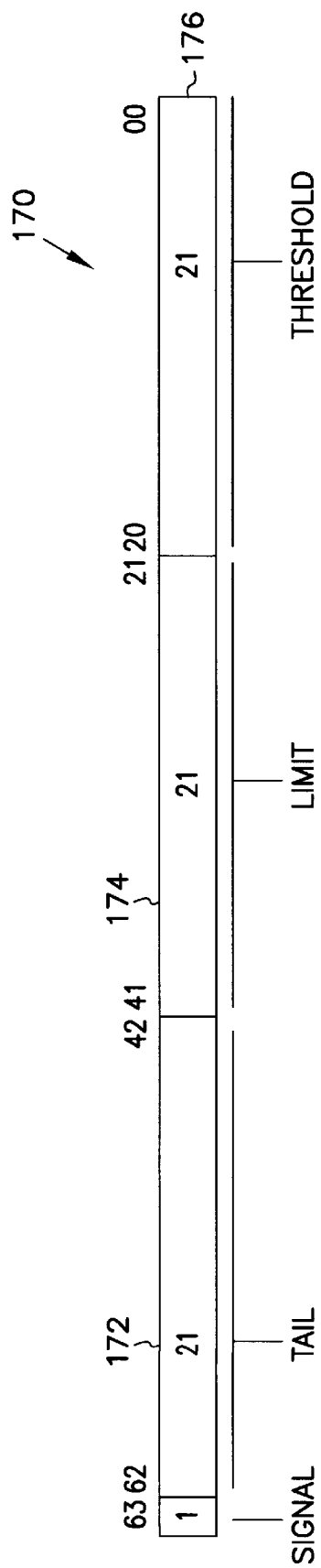
FIG. 13 shows a Message Queue Control Word used to control message traffic between processor elements.

In one embodiment, the SEND command sends 64-byte messages to a message queue residing at a predefined memory location. Messages are transmitted by first assembling the 64 bytes into an aligned block of eight E-registers and then issuing a SEND command. Many queues can exist simultaneously in memory. A message queue is created by constructing and storing a Message Queue Control Word (MQCW) 170 such as is shown in FIG. 13. FIG. 13 shows the fields in MQCW 170. Tail pointer 172 is a relative offset that is added to the address of the message queue control word to identify the tail of the queue (next available location). Tail pointer 172 is incremented by one as each message successfully arrives; it therefore has a granularity of 64 bytes. Tail pointer 172 should always be greater than 0 to avoid over-writing MQCW 170.

Limit 174 is a 21 bit value that indicates the top of the message queue. Sizes up to 128 MB are supported. Each time a message arrives, limit 174 is compared to tail pointer 172: if tail pointer 172 is greater than or equal to limit 174, the message is rejected and tail pointer 172 is not incremented.

Threshold 176 is a soft limit. As messages arrive and pass the limit test, tail pointer 172 is incremented and compared to threshold 176. If tail pointer 172 equals threshold 176, an interrupt is delivered to processor 110. Unlike the situation when tail pointer 172 is greater than or equal to limit 174, messages are not rejected when tail pointer 172 is greater than or equal to threshold 176.

One or more control words 170 are stored in local memory 104 of each PE 101. When a message arrives, the System Virtual Address (SVA) of control word 170 is added to tail pointer 172 to generate a new SVA for the message. The message SVA is checked for range errors prior to storing the message in the queue. If the store succeeds, an ACK response is returned to the sender. If the address is illegal, or there is a memory error while reading control word 170, a NACK containing error information is returned to the sender and the message store is aborted.

As the message exits the source E-registers, the ERS codes of the eight E-registers are set to empty. As the message successfully arrives in the destination queue, all eight source E-registers are set to the FULL state. If the message is rejected because the message queue is full, all eight source E-registers are set to state FULL_SR. If, however, there was a range or memory error at the target message queue the eight source E-registers are set to state FULL_F.

Each microprocessor 110 must maintain its own Head pointer to indicate the last message received (removed) from a message queue. This can be done in either hardware or software. To receive a message, the Head is added to the System Virtual Address of control word 170 and the message is retrieved from the resulting address with a GETV8 or direct cacheable load. Microprocessor 110 must compare tail pointer 172 with the head pointer for the message queue to determine when the queue has been emptied.

Note that since MQCW 170 exists in an arbitrary memory location in local memory 104, atomic memory operations can be used to update MQCW 170 and to manage the queues. In addition, the message queue control mechanism should be structured so that a processor initiated atomic operation on a control word 170 will exactly affect the flow of messages. For instance, if a swap is performed to redirect messages from one region of a message queue to another, the returned control word 170 should exactly represent the last message stored at the old region. No messages should be lost.

In one embodiment, message queue interrupt hardware captures the address of the control word 170 of the first message queue to signal a Threshold Exceeded interrupt. Hardware can also be used to record the fact that multiple queues have signalled Threshold Exceeded so that appropriate actions to service the additional interrupts can be initiated. An embodiment of the above-described message passing facility is described in "MESSAGING IN DISTRIBUTED MEMORY MULTIPROCESSING SYSTEM", U.S. patent application Ser. No. 08/615,694, filed Mar. 13, 1996 the description of which is hereby incorporated by reference.

I/O Control

In one embodiment, as is shown in FIG. 4, each processor element 101 includes a dedicated I/O port 118. Each I/O port 118 contains an I/O controller and a peripheral channel interface capable of sustaining a data bandwidth of over 500 MB/s concurrently in both the incoming and outgoing directions. The peripheral channels allow MPP system 100 to communicate directly with mainframes and peripherals having peripheral channel interfaces and, through channels adapters, to other networks such as HiPPi, Ethernet, FDDI, ATM, SCSI, etc. Since the peripheral channel is used for all I/O, system 100 requires only one type of bulkhead connector and one PE board type.

In one embodiment, each MPP system 100 includes a plurality of PE boards. Each PE board includes an I/O Controller 118 connected to four PEs 101 (through routers 116). Such a configuration is shown in FIG. 8. Each I/O controller 118 includes a controller chip and a peripheral channel interface. I/O channels are globally addressable, and may be controlled by the OS from any PE 101. That is, an I/O controller 118 has no special relationship with the four PEs to which it is connected.

Each processor 110 communicates with I/O devices connected to the peripheral channel interface via GETs, PUTs and SENDs to memory mapped register locations. Processor 110 initiates an I/O transfer by SENDing a transfer initiation message (TIM) to the appropriate I/O controller. GETs and PUTs are used for miscellaneous status-reading and for configuration of controllers. As in memory transfers, message transfers occur independently of the local processor 110.

Each I/O controller 118 includes logic for sending and receiving messages, for acting as a slave to incoming direct memory access (DMA) requests and for acting as a master for up to two concurrent DMA transfers, one outgoing and one incoming. For instance, an I/O controller 118 notifies the operating system (OS) of certain events (such as an incoming message) by sending messages to an OS-designated PE 101. Controllers 118 also include buffering for both incoming and outgoing data. In contrast to processor elements 101, I/O controllers 118 issue GET and PUT packets directly rather than through an E-register circuit. (In effect, I/O controller 118 emulates the E-register message passing facility without the use of E-registers.)

During transfers, traffic from/to the I/O controller is distributed round-robin over the four paths to local routers. This minimizes interference with any one PE's traffic, and reduces the bandwidth requirement of the router-to-I/O-controller links, allowing them to be implemented with fewer wires. The OS can configure the I/O controller to skip any of these links for fault tolerance or performance reasons.

An I/O controller's network address is based on the address of any of its four neighboring PE's. An additional address bit specifies memory-mapped register space, which is split between the router and the I/O controller. This addressing scheme gives each I/O controller four redundant network addresses, which allows the OS to dictate through which PE traffic to the I/O controller will be routed. Packets arriving at a router with the MMR bit set are either processed by the router or sent to the local I/O controller, according to the register address included in the packet.

The I/O controllers on MPP system 100 provide access to all peripheral channel functionality. To send a message on a peripheral channel, the operating system (OS) first places the message in a memory 104 and then sends a transfer initiation message (TIM) to the outgoing-message-MQCW 170 of the desired I/O channel. The TIM contains a pointer to and length of the outgoing message. In one embodiment, the length must be between 2 and 34, inclusive, and represents the number of words in the message, including header. The pointer is a global virtual address (GVA), specifying the PE and offset of the message in memory. The message is assumed to be stored stride one in a single PE's memory.

The I/O controller fetches messages from memory in the order in which it receives the corresponding TIMs, and transmits the messages onto the peripheral channel. No indication is provided back to the OS when the message is sent, although the message's target may respond with another message.

An I/O system such as is set out above is described in greater detail in INPUT/OUTPUT SYSTEM AND METHOD FOR A MASSIVELY PARALLEL PROCESSOR, U.S. patent application Ser. No. 08/614,859, filed Mar. 13, 1996, the description of which is hereby incorporated by reference.

Although the present invention has been described with reference to the preferred embodiments, those skilled in the art will recognize that changes may be made in form and detail without departing from the spirit and scope of the invention.

What is claimed is:

1. An external circuit for use in accessing a memory location within a system having a processor and a plurality of memory locations separate from the processor, wherein the plurality of memory locations includes a first memory location, the circuit comprising:

an address bus;

a data bus;

a plurality of external registers, including a first external register, connected to the data bus, wherein each of the plurality of external registers responds to an address written on the address bus to store data written by the processor on the data bus;

address translation means, connected to the address bus and to the data bus, for calculating, based on an index written to the data bus, an address associated with the first memory location; and transfer means, connected to the plurality of external registers, for transferring data between the first memory location and the first external register, wherein the transfer means includes means for supporting references to two or more of the plurality of memory locations at the same time.

2. The circuit according to claim 1 wherein the means for supporting references includes means for permitting out of sequence memory returns.

3. The circuit according to claim 1 wherein the means for supporting references includes means for reading a state code associated with each of the plurality of external registers, wherein the state code associated with the first external register indicates whether the transfer of data between the first memory location and the first external register has completed correctly.

4. The circuit according to claim 3, wherein the state codes are stored in a dual-ported random access memory.

5. The circuit according to claim 1 wherein the address translation means includes a remote translation buffer (RTB) used to convert a system virtual address to a physical address.

6. The circuit according to claim 1 wherein the address translation means includes an external register request queue used to store external register block write requests, wherein the external register request queue includes a plurality of queue entries, wherein each queue entry includes storage for a command, an external register pointer and a data argument.

7. A method of extending the address space of a microprocessor having an external data path, the method comprising the steps of:

providing a plurality of external registers, including a first external register;

defining a register operation data word having an index field;

writing an index into the index field; and executing a memory instruction, wherein the step of executing the memory instruction includes the steps of:

writing the register operation data word to an address associated with the first external register, wherein the step of writing includes the step of placing the register operation data word on said external data path;

calculating, based on the index, an address for a memory location; and transferring data between the memory location and the first external register.

8. The method according to claim 7 wherein the plurality of external registers further includes a second external register and wherein the step of providing further comprises the steps of:

storing a base address offset in the second external register; and wherein the step of calculating an address for a memory location comprises the steps of:

reading the base address offset stored in the second register;

calculating an offset value as a function of the index;

calculating a virtual address as a function of the offset value and the base address offset; and extracting a processor element number from the virtual address.

9. The method according to claim 8 wherein the register operation data word further includes a Mask/Offset/Operand block (MOB) pointer field and wherein the step of reading the base address includes the step of using the contents of the MOB pointer field to access said second external register.

10. The method according to claim 8 wherein the plurality of external registers further includes a third external register and wherein the step of extracting includes the steps of:

storing a centrifuge mask in the third external register; and applying the centrifuge mask to the virtual address to obtain the processor number.

11. A method of executing atomic operations in a system having a microprocessor, wherein the microprocessor includes an external data path, the method comprising the steps of:

providing a plurality of external registers, including a first external register;

defining a register operation data word having an index field;

writing an index into the index field;

storing a first operand into said first external register; and executing an atomic operation instruction, wherein the step of executing the atomic operation instruction includes the steps of:

writing the register operation data word to an address associated with the first external register, wherein the step of writing includes the step of placing the register operation data word on said external data path;

calculating, based on the index, an address for a memory location; and performing an indivisible read-modify-write operation on data stored in the memory location, wherein the step of performing an indivisible read-modify-write operation includes the steps of:

a) reading the memory location to obtain a second operand;

b) calculating a result as a function of the first and second operands; and c) storing the result in said memory location.

12. The method according to claim 11 wherein the step of calculating a result includes the step of writing the second operand into the first external register.

13. The method according to claim 11 wherein the plurality of external registers further includes a second external register, wherein the method further comprises the step of storing a base address offset in the second external register; and wherein the step of calculating an address comprises the steps of:

reading the base address offset stored in the second register;

calculating an offset value as a function of the index;

calculating a virtual address as a function of the offset value and the base address offset; and extracting a processor element number from the virtual address.

14. The method according to claim 13 wherein the register operation data word further includes a (Mask/Offset/Operand block) (MOB) pointer field containing a pointer and wherein the step of reading the base address includes the step of accessing said second external register via said pointer.

15. The method according to claim 13 wherein the plurality of external registers further includes a third external register and wherein the step of extracting includes the steps of:

storing a centrifuge mask in the third external register; and applying the centrifuge mask to the virtual address to obtain the processor number.

16. The method according to claim 11 wherein the step of providing a plurality of external registers includes the steps of:

providing a plurality of remote processing elements connected to the microprocessor over an interconnect network; and distributing the plurality of external registers so that each of the plurality of remote processing elements includes one external register from said plurality of external registers;

wherein the step of calculating an address for a memory location includes the step of determining the remote processing element associated with the memory location; and wherein the step of reading the memory location includes the steps of:

forming a memory request packet, wherein the memory request packet includes the first operand and an address corresponding to the memory location; and sending the memory request packet to the remote processing element associated with the memory location.

17. In a system including a microprocessor having an instruction set and an external data path, a method of extending the instruction set, the method comprising the steps of:

providing a plurality of external registers, including first, second and third external registers;

defining a register operation data word; and executing an extended instruction, wherein the step of executing the extended operation instruction includes the steps of:

writing the register operation data word to an address associated with the first external register, wherein the step of writing includes the step of placing the register operation data word on said external data path;

calculating a result as a function of the register operation data word; and storing the result in said first external register.

18. The method according to claim 17, wherein the register operation data word includes a Mask/Offset/Operand block MOB) pointer and wherein the step of calculating includes the steps of:

using the MOB pointer to read an operand from the second external register; and calculating the result as a function of the operand.

19. The method according to claim 17, wherein the register operation data word includes a Mask/Offset/Operand block (MOB) pointer and an index and wherein the step of calculating includes the steps of:

using the MOB pointer to read a centrifuge mask from the second external register;

using the MOB pointer to read a base address offset from the third external register; and calculating a processing element number and a memory offset as a function of the index, the base address offset and the centrifuge mask.

20. A method of executing an external register instruction, the method comprising the steps of:

providing a plurality of external registers;

defining a Mask/Offset/Operand block (MOB) pointer which points to an aligned block of arguments stored in the plurality of external registers;

defining an external register operation data word, wherein the external register operation data word includes an index field and an MOB pointer field;

storing an argument data word in the aligned block of arguments;

writing the MOB pointer into the MOB pointer field; and writing the external register operation data word to an external address, wherein the step of writing includes the steps of:

decoding the external address to determine the external register instruction;

extracting the MOB pointer from the MOB pointer field;

accessing the aligned block of arguments to obtain the argument data word; and calculating a result as a function of the argument data word.

* * * * *